US012086481B2

(12) United States Patent
Lee

(10) Patent No.: US 12,086,481 B2
(45) Date of Patent: Sep. 10, 2024

(54) PROVIDING BURST MODE FASTER THAN PRESET THRESHOLD SPEED

(71) Applicant: Hewlett-Packard Development Company, L.P., Spring, TX (US)

(72) Inventor: Uichoon Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/031,424

(22) PCT Filed: Sep. 20, 2021

(86) PCT No.: PCT/US2021/051105
§ 371 (c)(1),
(2) Date: Apr. 12, 2023

(87) PCT Pub. No.: WO2022/081305
PCT Pub. Date: Apr. 21, 2022

(65) Prior Publication Data
US 2023/0384992 A1 Nov. 30, 2023

(30) Foreign Application Priority Data
Oct. 16, 2020 (KR) .................. 10-2020-0133884

(51) Int. Cl.
*G06F 3/12* (2006.01)
(52) U.S. Cl.
CPC .......... *G06F 3/1215* (2013.01); *G06F 3/1258* (2013.01)
(58) Field of Classification Search
USPC ........................................ 358/400, 1.15, 1.9
See application file for complete search history.

(56) References Cited

U.S. PATENT DOCUMENTS

| 6,650,436 B1 | 11/2003 | Hamamoto et al. |
| 8,317,314 B2 | 11/2012 | Kohne et al. |
| 10,261,453 B2 | 4/2019 | Tomihisa |
| 2005/0088670 A1* | 4/2005 | Folkins ............... B41J 13/0009 358/1.15 |
| 2005/0089349 A1* | 4/2005 | Folkins ............. G03G 15/0131 399/300 |
| 2011/0188060 A1 | 8/2011 | Voss |
| 2014/0268247 A1* | 9/2014 | Sakaida ............. H04N 1/00068 358/450 |
| 2015/0276825 A1* | 10/2015 | Curt ................... G01R 19/2513 702/58 |
| 2019/0303060 A1 | 10/2019 | Ozeki et al. |
| 2020/0202186 A1 | 6/2020 | Hosomizo |

FOREIGN PATENT DOCUMENTS

| JP | 2012-245649 A | 12/2012 |
| JP | 2016-120676 A | 7/2016 |
| JP | 2019-171830 A | 10/2019 |
| JP | 2020-102057 A | 7/2020 |

* cited by examiner

*Primary Examiner* — Quang N Vo
(74) *Attorney, Agent, or Firm* — Brooks, Cameron & Huebsch, PLLC

(57) ABSTRACT

An example method of operating an image forming apparatus includes activating a burst mode function to provide a speed faster than a threshold speed of a general speed mode for a job having a specific condition, determining whether a requested job satisfies the specific condition, setting a speed mode of the requested job satisfying the specific condition as the burst mode, and controlling a device related to image formation to operate in the burst mode when a processing order of the requested job is reached.

17 Claims, 8 Drawing Sheets

PROVIDING BURST MODE FASTER THAN PRESET THRESHOLD SPEED

BACKGROUND

An image forming apparatus performs operations such as generating and printing image data. A maximum speed to perform a job is predetermined for the image forming apparatus and the image forming apparatus may operate in a low rate mode that is slower than the maximum speed if necessary. For example, since a printing job using a paper having a thickness greater than a paper of normal thickness requires a larger amount of fixing heat than the paper of normal thickness, the image forming apparatus may print at a speed slower than the maximum speed. Here, the maximum speed of the image forming apparatus is set to be a threshold speed capable of providing an optimal image quality and performance even if the jobs are processed under various conditions.

DETAILED DESCRIPTION

Figure 1:
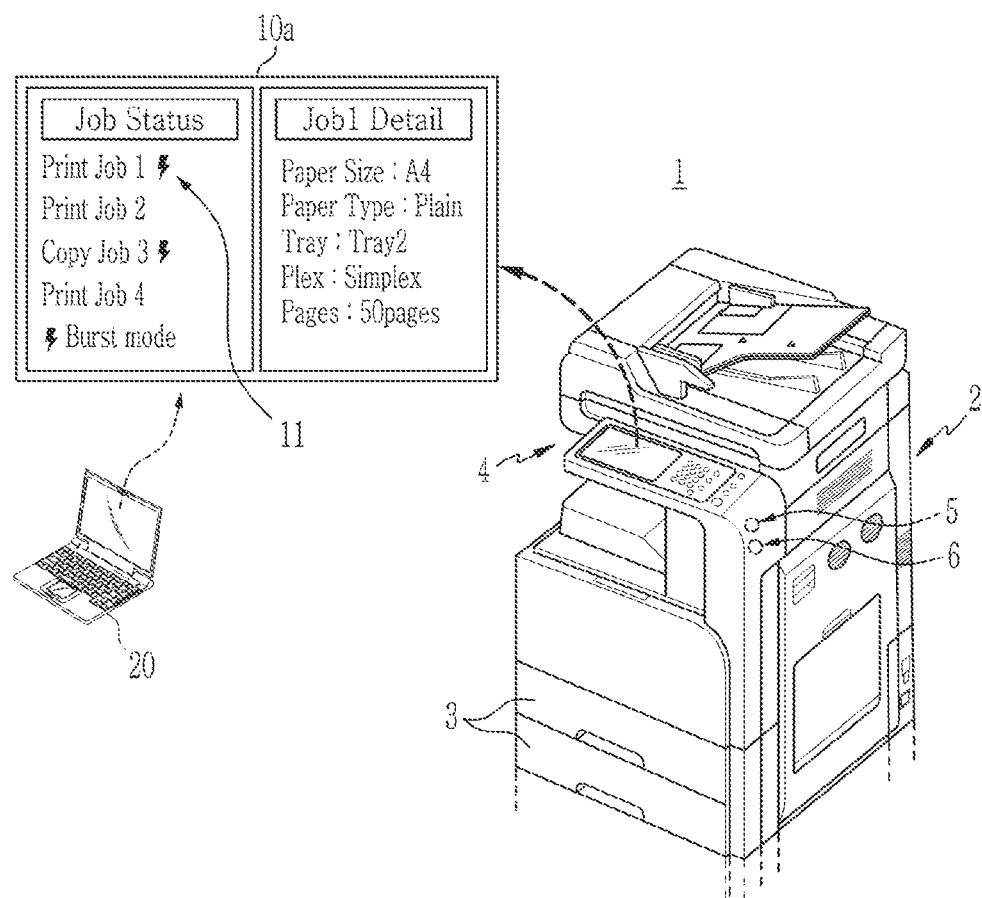
FIG. 1 is a diagram illustrating an image forming apparatus providing a burst mode according to an example.

An image forming apparatus can operate in various temperature and humidity environments and can perform various types of jobs. Considering that the image forming apparatus operates under such various conditions, a threshold speed at which an optimal image quality and performance can be provided for any of the various conditions is set. For example, when performing a printing job at an output speed of up to 30 pages per minute (ppm), an image forming apparatus can provide a predetermined level of image quality for both text data and graphic data.

Since the threshold speed is determined in consideration of even unfavorable conditions to obtain the optimal image quality, the processing speed may be limited to the threshold speed even though some jobs can be printed faster. For example, an image forming apparatus capable of outputting graphic data of the optimal image quality at the speed of 30 ppm is limited to the threshold speed, even though the image forming apparatus can output a job including only text data faster than 30 ppm. In other words, at the threshold speed determined to obtain the optimal image quality, text data and graphic data are dealt with under the same condition. Thus, the hardware is not used at full performance all the time.

To address the above-described issues, examples provide an image forming apparatus that determines a job capable of being performed at a speed faster than a predetermined threshold speed and selectively provides a burst mode to operate the image forming apparatus faster than the threshold speed.

In the description, the term "threshold speed" refers to a predetermined speed at which an optimal image quality and performance in various conditions may be provided, and is a maximum speed set in a general speed mode. For example, under a condition to satisfy the image quality for various graphic data at a temperature of 4° C.-45° C., at a relative humidity of 0%-90%, and on a paper of 60 gsm-120 gsm, the maximum speed which can be provided by the image forming apparatus may be determined as the threshold speed. In other words, the threshold speed may be a speed at which the optimal quality and performance may be provided in various temperature and humidity environments, for paper of various sizes, weights, and thicknesses, and for graphic data along with text data. Further, the threshold speed may be the maximum speed which can be usually provided by product specifications.

Additionally, the general speed mode may further include a low rate mode. For example, in a case of a printing job using a paper thicker than a paper of a normal thickness, since a larger amount of fixing heat is required as compared to that used for the paper of a normal thickness, the image forming apparatus may operate in a low rate mode that is slower than the threshold speed. Alternatively, when data processing is slower than the printing speed, the continuous output may not be performed, and thus the image forming apparatus may operate in a low rate mode slower than the threshold speed.

In the description, the term "burst mode" refers to a mode capable of operating at a speed faster than a threshold speed predetermined in a general speed mode and may be variously named. The burst mode can be selectively applied to a job satisfying a specific condition and/or a job requested from a user. The specific condition may be set based on a job condition considered in the threshold speed. Further, a condition for selecting a job having a relatively low workload and being capable of improving hardware performance may be set as the specific condition.

The "burst mode speed" refers to a predetermined speed for the burst mode and may be determined in consideration of the hardware performance capable of processing a job satisfying a specific condition. For example, the burst mode speed may be determined in consideration of the performance of a drive motor of the image forming apparatus, toner supply performance, a fixing heat, and the like. A burst mode speed may be set, and the speed may be differentially selected according to differing jobs. In the description, an example is provided in which the threshold speed of the image forming apparatus is 30 ppm and the burst mode speed is 60 ppm. However, these speeds are to be understood as examples and not as limitations in application.

In the description, the image forming apparatus may be, for example, a printer, a scanner, a copying machine, a fax machine, or a multi-function peripheral implementing functions thereof. A printing job may be described as an example of a job performed by the image forming apparatus, and the speed may refer to a processing speed, an output speed, a printing speed, and the like.

In the description, the image forming apparatus may comprise a controller including a processor and a memory, and mechanical devices and electronic devices operated by the controller. The processor of the controller can process example operations by executing a computer readable computer program. The computer program includes instructions that implement an example operation method described with reference to the attached drawings. In the description, it may be interchangeably described that controlling is performed by either the controller or the processor.

Hereinafter, examples will be described with reference to the attached drawings so that the person of ordinary skill in the art may easily implement the present disclosure. However, the present disclosure may be modified in various ways and is not limited to the examples described herein. In the drawings, like reference numerals designate like elements throughout the specification.

In the description, when a part is referred to "include" or "comprise" a certain element, it means that the part may further include or comprise other elements rather than exclude other elements, unless specifically indicated otherwise.

In the description, the terms "transmit" or "provide" may be used to include not only direct transmission or provision but also indirect transmission or provision through another device or by using a bypass.

In the description, the singular forms "a," "an," and "the" are intended to include the plural forms as well, unless an explicit expression such as "one" or "singular" is used.

In the description, an operation order described in a flowchart may be changed, several operations may be merged, certain operations may be divided, and specific operations may not be performed.

In the description, the terms "-er," "-or," "unit," and "module" refer to units for processing a function or operation, and can be implemented by software, hardware, or a combination thereof.

Figure 2:
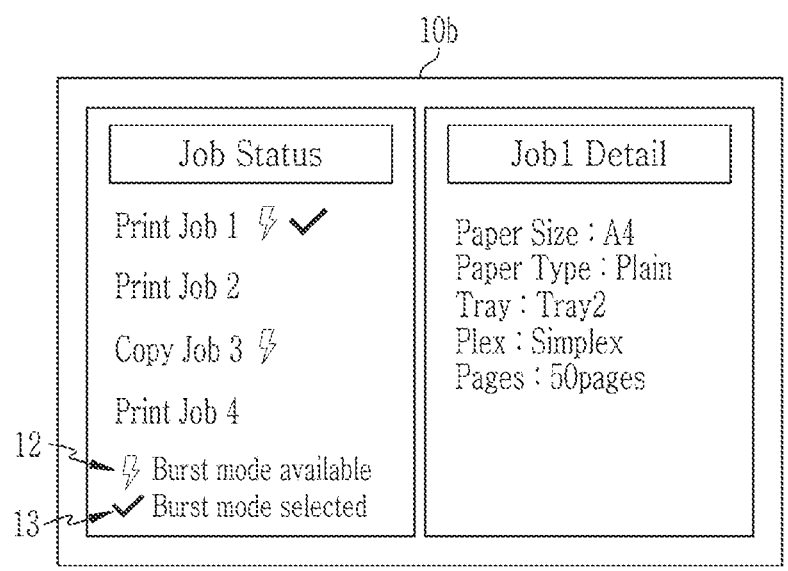
FIG. 2 and FIG. 3 are diagrams illustrating a user interface displaying a burst mode according to an example.
Figure 3:
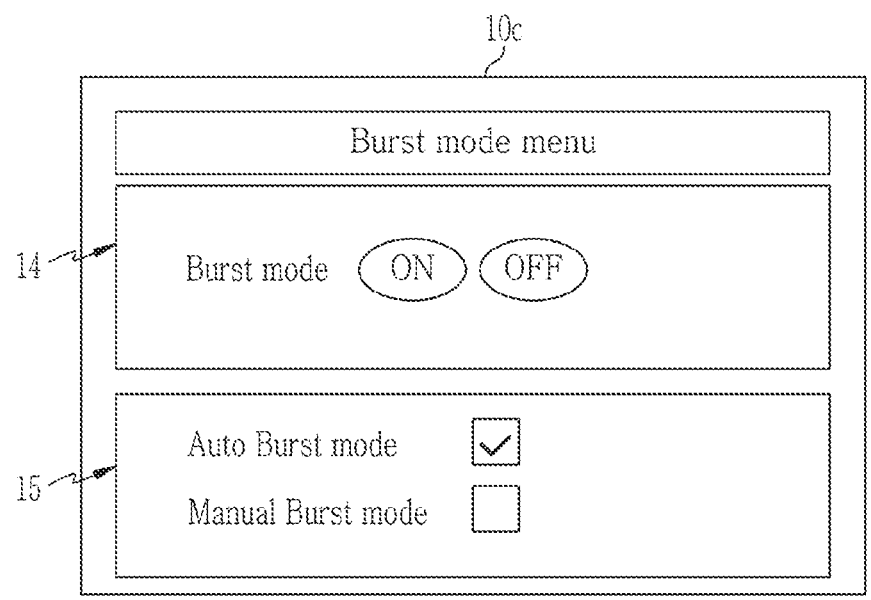
Figure 4:
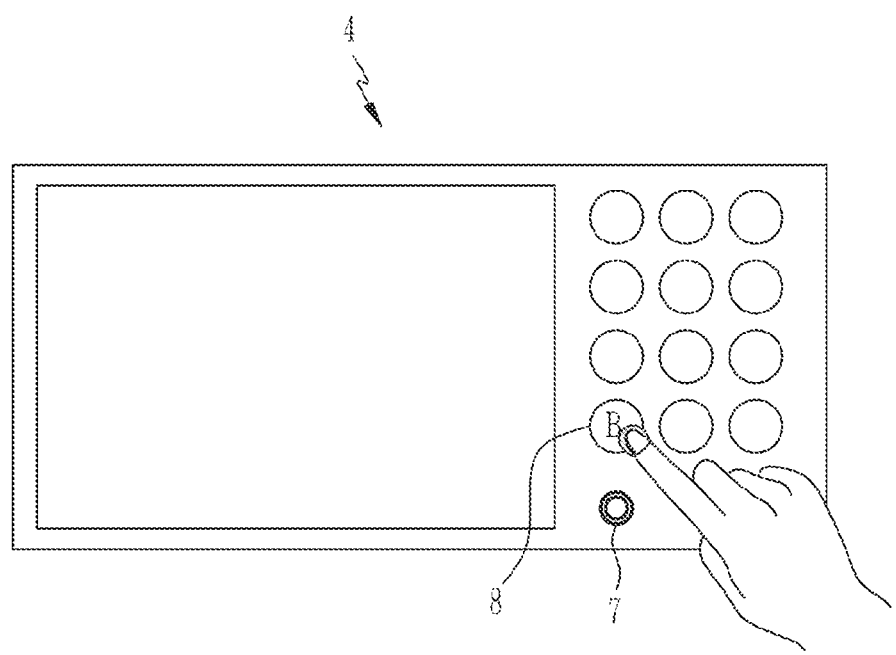
FIG. 4 is a diagram illustrating an operation panel of an image forming apparatus providing a burst mode according to an example.

FIG. 1 is a diagram illustrating an image forming apparatus providing a burst mode according to an example. Each of FIG. 2 and FIG. 3 is a diagram illustrating a user interface displaying a burst mode according to an example. FIG. 4 is a diagram illustrating an operation panel of an image forming apparatus providing a burst mode according to an example.

Referring to FIG. 1, an image forming apparatus 1 may include a body 2, a cassette 3 that can be attached to and detached from the body 2 and can supply print medium to the body 2, and an operation panel 4 equipped with a display and an input unit (e.g., buttons). In an example, the display and the input unit may be provided as a touch screen. The image forming apparatus 1 may include a temperature sensor 5 and a humidity sensor 6 that can obtain external environment information. The temperature sensor 5 and the humidity sensor 6 may be placed in various positions depending on the design.

The display of the operation panel 4 can display a current status and a job status of the image forming apparatus 1, information requesting a user response, various menus, etc. The operation panel 4 may include buttons (e.g., a power button, a job status button, number buttons, a function return button, etc.) through which the user can manipulate the image forming apparatus.

The image forming apparatus 1 may provide a speed mode capable of operating at a speed (e.g., 60 ppm) faster than a threshold speed (e.g., 30 ppm) predetermined for a general speed mode. In an example, the speed mode that operates at a speed faster than the threshold speed is referred to as a "burst mode," but may be named differently. In an example, the "threshold speed" is a predetermined speed to provide the optimal image quality and performance in various conditions, and it is assumed as a maximum speed set for the general speed mode.

The image forming apparatus 1 may selectively apply a burst mode to a job satisfying a specific condition and/or a job requested from a user. The specific condition may be referred as a burst mode condition and may be set to include environment information, a job property, a job data characteristic, and the like.

A certain range of temperature and humidity may be designated as the environmental information constituting the burst mode condition.

Properties regarding a print medium such as paper size, paper type, simplex printing, a tray, image quality, and the like may be designated as the job property constituting the burst mode condition. The image quality may be expressed in dots per inch (DPI).

As the job data characteristic constituting the burst mode condition, a graphic data ratio (e.g., equal to or less than 15%), a blank and text data ratio (e.g., equal to or more than 85%) and the like included in the request job may be designated. In the description, the graphic data ratio may be mainly described as an example. When a job is mostly composed of text data or includes a large amount of blanks, since it is possible to operate at a speed faster than a threshold speed predetermined in consideration of graphic data, the data characteristic condition can be set so that the burst mode is applied. For example, if, in addition to the graphic data ratio or the blank and text data ratio, a ratio of graphic data to text data included in the requested job is equal to or less than 20%, a data characteristic condition may be set to apply the burst mode. The graphic data ratio or text data ratio may be calculated using the number of graphic pixels or the number of text pixels.

The burst mode condition may be fixed for the image forming apparatus 1 or may be selected from selectable conditions by an administrator. In addition, the set value of the burst mode condition may be fixed to a value determined according to the hardware performance of the image forming apparatus, or may be changed within a range predetermined by the administrator. In an example, as shown in Table 1, the environment information, the job property, and the job data characteristic are set as the burst mode condition, and may have set values of lower conditions (e.g., minimums or thresholds).

TABLE 1

| Burst mode condition | Set value |
| --- | --- |
| Environment information | Temperature range: 18° C.-35° C. Humidity range: 35%-75% |
| Job property | Paper size: Equal to or less than 218 mm (A4/Letter) Paper type: Plain (71 gsm-90 gsm) Plex: Simplex printing Tray: Basic Tray (Tray1 or Tray2) Image quality: 600 dpi |
| Job data characteristic | Graphic data ratio is equal to or less than 15%, Or, the ratio of blank and text data is equal to or more than 85% |

The job data characteristic can be analyzed depending on a function of the image forming apparatus 1. For example, when it is possible to analyze job data through data preprocessing, the image forming apparatus 1 can directly analyze the graphic data ratio for each page. If the image forming apparatus 1 does not support job data analysis, the image forming apparatus 1 may infer the graphic data ratio included in the job using the amount of data included in each page. For example, the image forming apparatus 1 may infer the graphic data ratio included in a job from the number of pages requested for the job and a file size, by using the data amount of a page with a graphic data ratio of 15%.

The image forming apparatus 1 may determine whether the requested job satisfies a specific condition required for applying the burst mode, and may set a job satisfying the specific condition as the burst mode. Here, the image forming apparatus 1 may automatically set a job satisfying a specific condition as a burst mode. Alternatively, the image forming apparatus 1 may determine a job satisfying the specific condition to be burst mode available and set the burst mode according to a user request.

In the image forming apparatus 1, the burst mode function may be activated and/or deactivated according to the administrator's setting. When the burst mode function is activated or deactivated, the image forming apparatus 1 may externally display the activation or deactivation of the burst mode function for the recognition of the user.

As illustrated in FIG. 1, a user interface 10a may display a job status of the image forming apparatus 1. The user interface 10a may be displayed on a display of the operation panel 4. Alternatively, in order to request a job from the image forming apparatus 1 or in order to manage the image forming apparatus 1, the user interface 10a may be displayed on the image forming apparatus 1 or a user terminal 20 connected to a management server of the image forming apparatus 1.

On the user interface 10a, Job1, Job2, Job3, and Job4 registered in a standby storage can be displayed. Here, when the speed modes of Job 1 and Job 3 are set as the burst mode in the image forming apparatus 1, a burst mode indicator 11 for distinguishing the burst mode from the general speed mode may be displayed. The burst mode indicator 11 may be variously changed, and the display position of the burst mode indicator 11 also may be variously changed. In addition, the burst mode indicator 11 is not required to be displayed using a separate image and may be displayed, for example, by way of changing the name of the corresponding job to a color representing a burst mode.

Through the burst mode indicator displayed on the user interface as described above, the user can check a job set as the burst mode.

Referring to FIG. 2, a job status of an image forming apparatus 1 may be displayed as illustrated by a user interface 10b. Among Job1, Job2, Job3, and Job4 displayed on the user interface 10b, an indicator 12 representing that the job is burst mode available may be attached to Job1 and Job3, and an indicator 13 representing that the job is set as a burst mode may be attached to Job1.

Through the burst mode related indicators 12 and 13 displayed on the user interface 10b, a user can check burst mode available jobs and jobs set as the burst mode. In addition, since it can be seen that Job3 is a burst mode available job, the user can change Job3 to the burst mode.

Referring to FIG. 3, an image forming apparatus 1 may provide a user interface 10c for burst mode related setting.

The user interface 10c may provide a setting menu 14 for activation (ON) or deactivation (OFF) of a burst mode function. When the burst mode function is activated, the user interface 10c may provide a setting menu 15 for selecting an automatic burst mode and a manual burst mode.

In an example, when the burst mode function is deactivated in the setting menu 14, the image forming apparatus 1 may not perform a process of determining whether a job satisfies a burst mode condition and may perform the job in a general speed mode.

When the burst mode function is activated in the setting menu 14, the image forming apparatus 1 may perform a process of determining whether the job satisfies the burst mode condition. If the automatic burst mode is selected in the setting menu 15, the image forming apparatus 1 may set a speed mode of the job satisfying the burst mode condition as the burst mode. When the manual burst mode is selected in the setting menu 15, the image forming apparatus 1 may display a job satisfying the burst mode condition as a burst mode available job and may set the speed mode of the job as the burst mode according to the user selection.

Referring to FIG. 4, an operation panel 4 of the image forming apparatus 1 may include a light emitting device 7 indicating the activation or deactivation of a burst mode function. The light emitting device 7 may be, for example, a light emitting diode (LED). The light emitting device 7 may be turned on, turned off, or flickered according to the control of a controller. For example, the light emitting device 7 may be turned on when the burst mode function is activated and turned off when the burst mode function is deactivated. When a printing job of Job 1 is performed in the burst mode while the burst mode function is activated, the light emitting device 7 may flicker to indicate that high-speed printing is currently being performed with the burst mode.

In an example, the image forming apparatus 1 can visually indicate the activation and/or deactivation status of the burst mode function and information that printing is being performed with the burst mode on the display of the operation panel 4, without using a separate light emitting device 7.

The operation panel 4 of the image forming apparatus 1 may include a button 8 through which a user can activate and/or deactivate a burst mode function or can set a burst mode for a specific job. For example, when the user interface 10b as shown in FIG. 2 is provided on the display of the operation panel 4, the user can select the button 8 to change Job 3 being a burst mode available job to the burst mode.

In an example, the image forming apparatus 1 may assign a function to enable easy access to a burst mode menu to the button 8. When the button 8 is selected, the image forming apparatus may activate and/or deactivate the burst mode function or may show a menu to set the burst mode for a specific job on the display of the operation panel 4.

In an example, the image forming apparatus 1 may provide a menu to enable easy access to the burst mode menu from the display of the operation panel 4 even without an additional button 8. Even without a separate button 8, the image forming apparatus 1 may provide a menu for activating and/or deactivating the burst mode function in the burst mode menu or for setting the burst mode for a specific job and may perform setting according to a touch input.

Hereinafter, an example method of providing a burst mode by the image forming apparatus 1 will be described.

Figure 5:
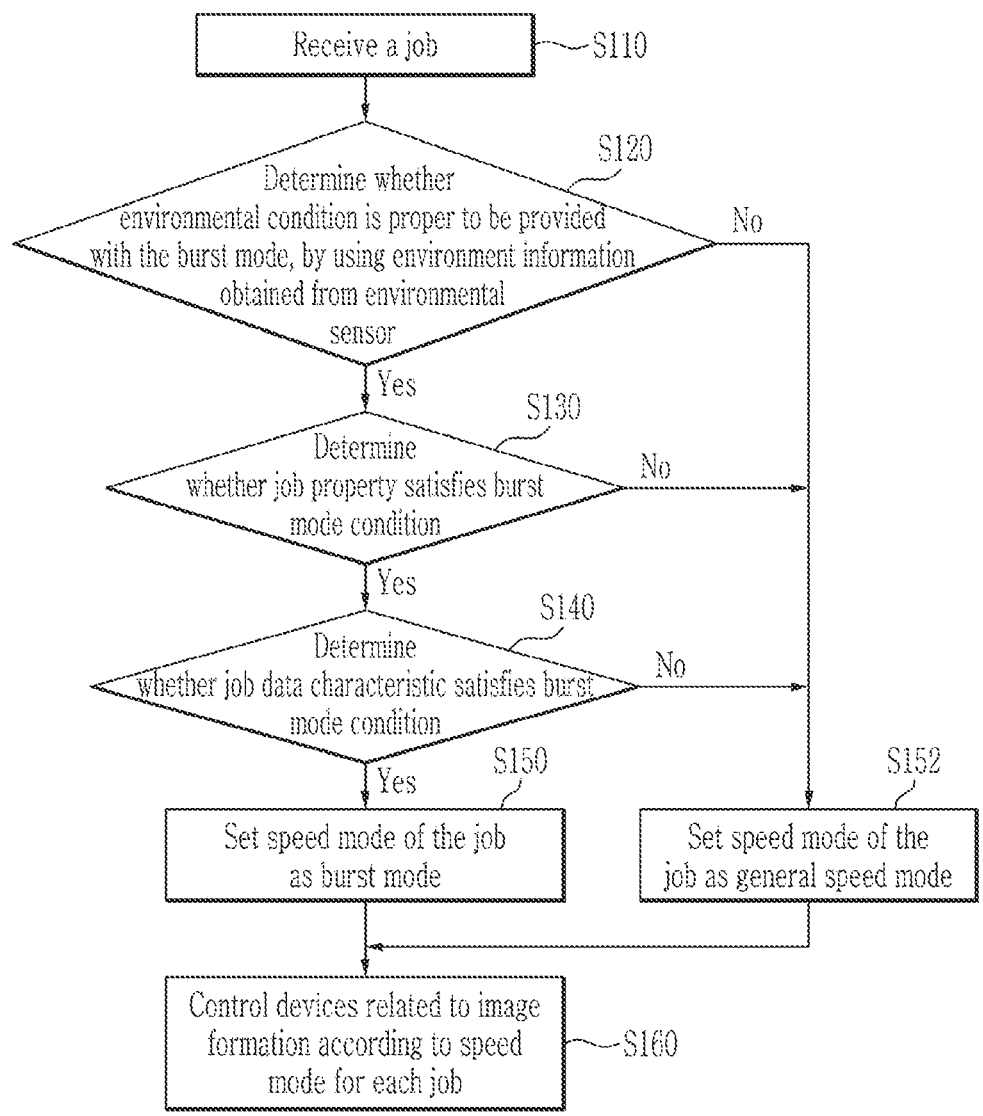
FIG. 5 is a flowchart showing a method of setting a burst mode according to an example.

FIG. 5 is a flowchart showing a method of setting a burst mode according to an example.

Referring to FIG. 5, an image forming apparatus 1 operated by a processor may provide a general speed mode in which a threshold speed (e.g., 30 ppm) for providing the optimal image quality and performance under various conditions is predetermined, and a burst mode in which a job satisfying a specific condition is performed with a speed (e.g., 60 ppm) faster than the threshold speed of the general speed mode. The image forming apparatus 1 may determine whether a requested job satisfies the specific condition while the burst mode function is activated. The specific condition may be set to include environment information, a job property, a job data characteristic, and the like. In the following, it is assumed that the environment information, the job property, and the job data characteristic are set as the burst mode condition and the set values are as shown in Table 1.

The image forming apparatus 1 receives a job at operation S110.

At operation S120, the image forming apparatus 1 determines whether the environmental condition is suitable for operation using the burst mode, by using the environment information (temperature and humidity) obtained from an environmental sensor (e.g., a temperature sensor and a humidity sensor). For example, when the temperature measured by a temperature sensor 5 is 25° C. and the humidity measured by a humidity sensor 6 is 50%, the image forming apparatus 1 may determine that the environmental condition for the burst mode is satisfied. In another example, when the burst mode function is activated, the image forming apparatus 1 may firstly determine an environmental condition that does not support the burst mode. For example, if the burst mode function is activated by an administrator but the current environment information does not satisfy the environmental condition (e.g., the current temperature is 15° C.), the image forming apparatus 1 may deactivate the burst mode function or provide the administrator with a notification that the burst mode function cannot be used. Alternatively, the image forming apparatus 1 may periodically determine whether the current environment information is in a state where the burst mode can be provided, and may automatically activate and/or deactivate the burst mode function.

When the measured environment information (e.g., temperature and humidity) satisfies the burst mode condition, the image forming apparatus 1 determines whether the job property satisfies the burst mode condition at operation S130. For example, if the job property of the requested job includes A4 size paper, a paper with normal weight, simplex printing, a basic tray (Tray2), and 600 dpi, the image forming apparatus 1 may determine that the requested job satisfies the job property of the burst mode condition.

When the job property satisfies the burst mode condition, the image forming apparatus 1 determines whether the job data characteristic satisfies the burst mode condition at operation S140. For example, the image forming apparatus 1 may analyze the data included in the requested job and determine that the burst mode can be provided when the graphic data ratio is equal to or less than 15%. The image forming apparatus 1 may calculate a graphic data ratio for each page included in the requested job to determine whether the burst mode condition is satisfied for each page. If all the pages satisfy the burst mode condition, it can be determined that the job satisfies the burst mode condition. Alternatively, the image forming apparatus 1 may calculate the graphic data ratio for each page included in the requested job to determine whether the burst mode condition is satisfied for each page. If equal to or more than a predetermined number of pages among all of the pages satisfy the burst mode condition, it can be determined that the job satisfies the burst mode condition.

When the job data characteristic satisfies the burst mode condition, the image forming apparatus 1 sets a speed mode of the job as the burst mode at operation S150. As in the user interface 10a shown in FIG. 1, the image forming apparatus 1 may display that the speed mode of the requested job is the burst mode. Alternatively, as in the user interface 10b shown in FIG. 2, the image forming apparatus 1 may display that the requested job is burst mode available.

When any of the environment information, the job property, or the job data characteristic do not satisfy the burst mode condition, the image forming apparatus 1 sets the speed mode of the requested job as the general speed mode at operation S152.

The image forming apparatus 1 controls devices related to image formation according to the speed mode for each job at operation S160.

When the processing order of a job with a speed mode predetermined as the burst mode is reached, the image forming apparatus 1 may control the devices related to image formation to change from the general speed mode to the burst mode and may process the corresponding job with the burst mode speed. When the job set as the burst mode is completed, the image forming apparatus 1 may control the devices related to image formation to operate in a general speed mode from the burst mode.

The devices related to image formation may be devices that participate in a series of image forming processes including pickup and feed of a printing medium, developing an electrostatic latent image of image data formed on a photoconductive drum with a toner, transferring the developed toner image onto the printing medium, fusing the transferred toner image into the printing medium with heat and pressure, discharging the printing medium, and the like. The devices related to image formation may be controlled by a controller of the image forming apparatus 1. For example, the controller may process a printing job with the burst mode speed of 60 ppm, which is twice as fast as a threshold speed of 30 ppm of the general speed mode. To do this, through control of the controller, the processing speed may be doubled by increasing a drive current of a motor transmitting power to the devices related to image formation, the amount of toner supply may be increased by reducing the toner supply cycle by ½, and the paper feeding interval may be reduced by ½. In addition, the controller may change a voltage related to development to correspond to the burst mode and may set a target temperature of a fixing temperature to be higher than the general speed mode.

An example method of determining whether to set a requested job as a burst mode by the image forming apparatus 1 may vary as follows.

The image forming apparatus 1 may determine whether the burst mode can be provided for each job, and may set a speed mode for each job.

The image forming apparatus 1 may determine whether the burst mode can be provided for each page bundle of a certain amount (e.g., 20 pages) in a job, and may determine a speed mode for each page bundle. For example, if the requested job is to print equal to or more than 40 pages, the image forming apparatus may determine whether the data characteristic for every 20 pages satisfies a burst mode condition. The image forming apparatus may print from page 1 to page 20 with the burst mode and print from page 21 to page 40 including more graphic data than a criterion with a general speed mode.

The image forming apparatus 1 may use the number of pages of a job as the burst mode condition. If a job includes equal to or less than a certain number of pages (e.g., 10 pages), the general speed mode may be set for the job even though the remaining job properties and the job data characteristics are satisfied.

Figure 6:
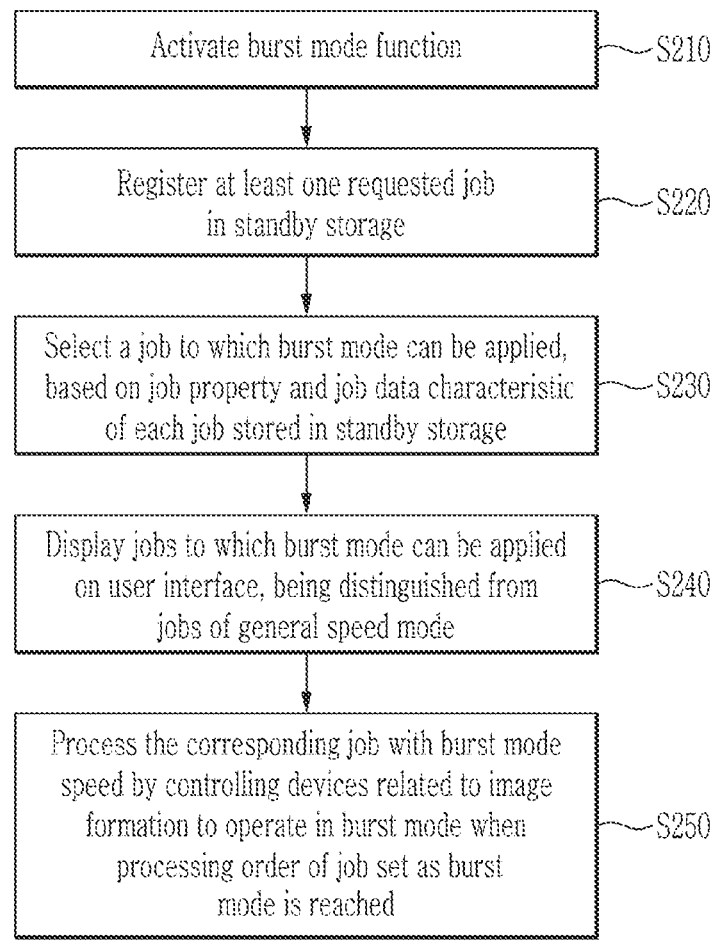
FIG. 6 is a flowchart showing a method of operating in a burst mode according to an example.

FIG. 6 is a flowchart showing a method of operating in a burst mode according to an example.

Referring to FIG. 6, an image forming apparatus 1 operated by a processor activates a burst mode function at operation S210. The image forming apparatus 1 may automatically activate the burst mode function when the obtained environment information satisfies the burst mode condition. Alternatively, when the burst mode function is activated by an administrator, the image forming apparatus 1 may determine whether the environment information enables provision of the burst mode function and may activate the burst mode function.

The image forming apparatus 1 may register at least one requested job in a standby storage at operation S220.

The image forming apparatus 1 may select a job to which the burst mode can be applied, based on the job property and job data characteristic of each job stored in the standby storage at operation S230. The job property and job data characteristic that make it possible to apply the burst mode may be determined according to the performance of the image forming apparatus.

The image forming apparatus 1 may display jobs to which the burst mode can be applied on a user interface, being distinguished from jobs of a general speed mode at operation S240. The image forming apparatus 1 may provide a burst mode indicator representing that the job is set as the burst mode, as shown in the user interface 10a of FIG. 1. Alternatively, the image forming apparatus 1 may provide an indicator representing that the job is burst mode available, and an indicator representing a job set as the burst mode, as shown in the user interface 10b of FIG. 2. In the user interface 10b, a user can set a burst mode available job to be performed in the burst mode.

When the processing order of a job set as the burst mode is reached, the image forming apparatus 1 may process the corresponding job with the burst mode speed by controlling the devices related to image formation to operate in the burst mode at operation S250. The image forming apparatus 1 may display that high-speed printing is currently being performed in the burst mode, through a display and/or a light emitting device 7 of the operation panel 4.

Figure 7:
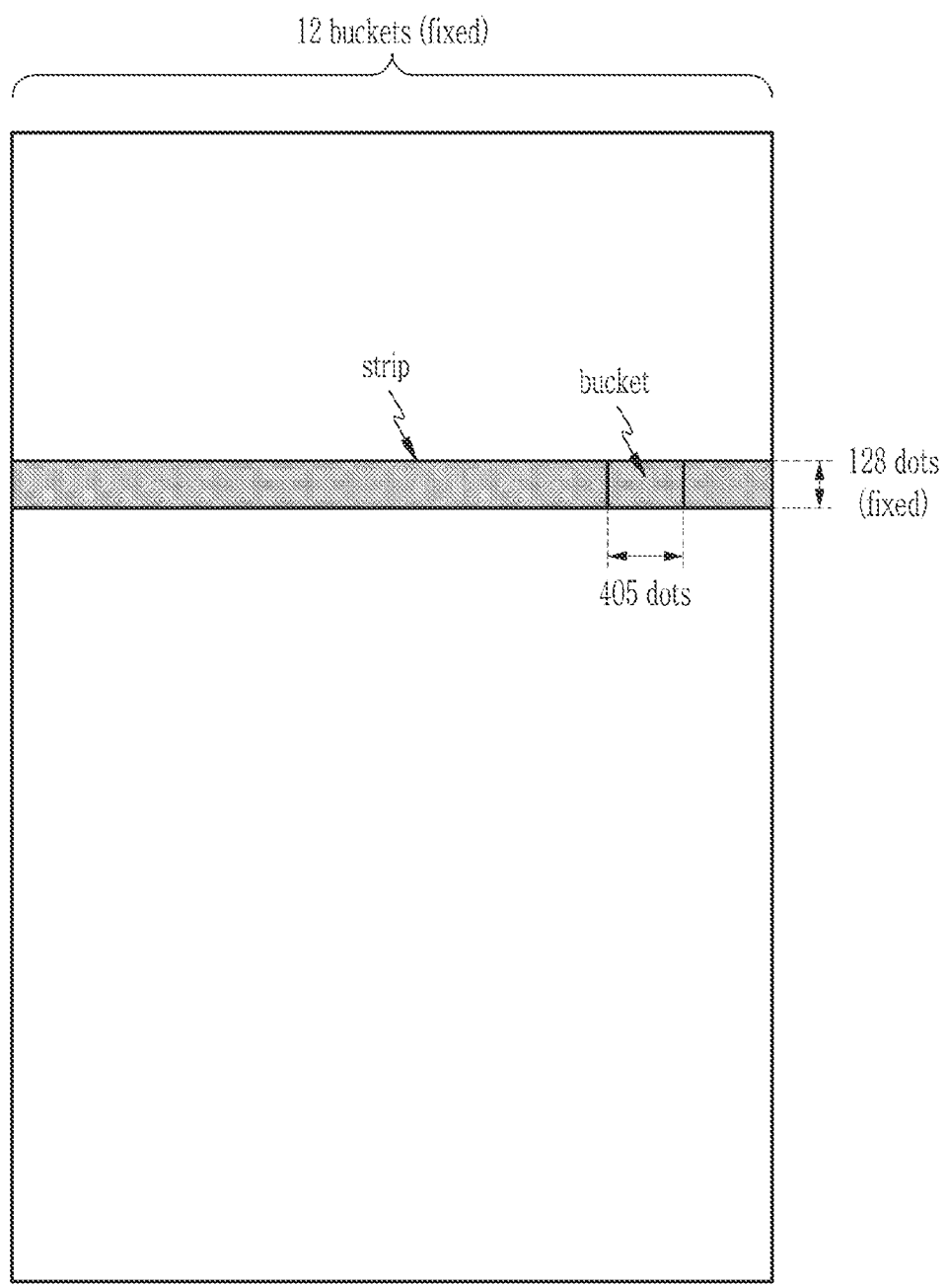
FIG. 7 is a diagram for explaining a method of analyzing job data for setting a burst mode according to an example.

FIG. 7 is a diagram for explaining a method of analyzing job data for setting a burst mode according to an example.

Referring to FIG. 7, a graphic data ratio may be analyzed for each page included in a job. An example method of calculating the graphic data ratio of each page may be various.

The image forming apparatus 1 may analyze the number of graphic pixels constituting a page and may determine that a burst mode condition is satisfied when a ratio of the number of graphic pixels to the number of entire dots is equal to or less than to a predetermined ratio (e.g., 15%).

For example, when image data is printed on A4 size paper at 600 dpi, the number of dots constituting a page may be calculated. When printing on a paper of 210 mm width is performed at 600 dpi, the width is approximately 4,860 dots, and the width of the page is fixed at twelve buckets. Thus, the width of a bucket may have 405 dots. The number of buckets constituting one strip is fixed at 12, and the length of a bucket is fixed at 128 dots. Thus, when printing on a paper of 290 mm length is performed at 600 dpi, a page may include approximately 52 strips.

Since pixel values for each bucket are provided with text or graphic, the number of text pixels and the number of graphic pixels included in each strip can be calculated. Through this, the image forming apparatus 1 may calculate a ratio of the number of graphic pixels to the number of entire dots.

Figure 8:
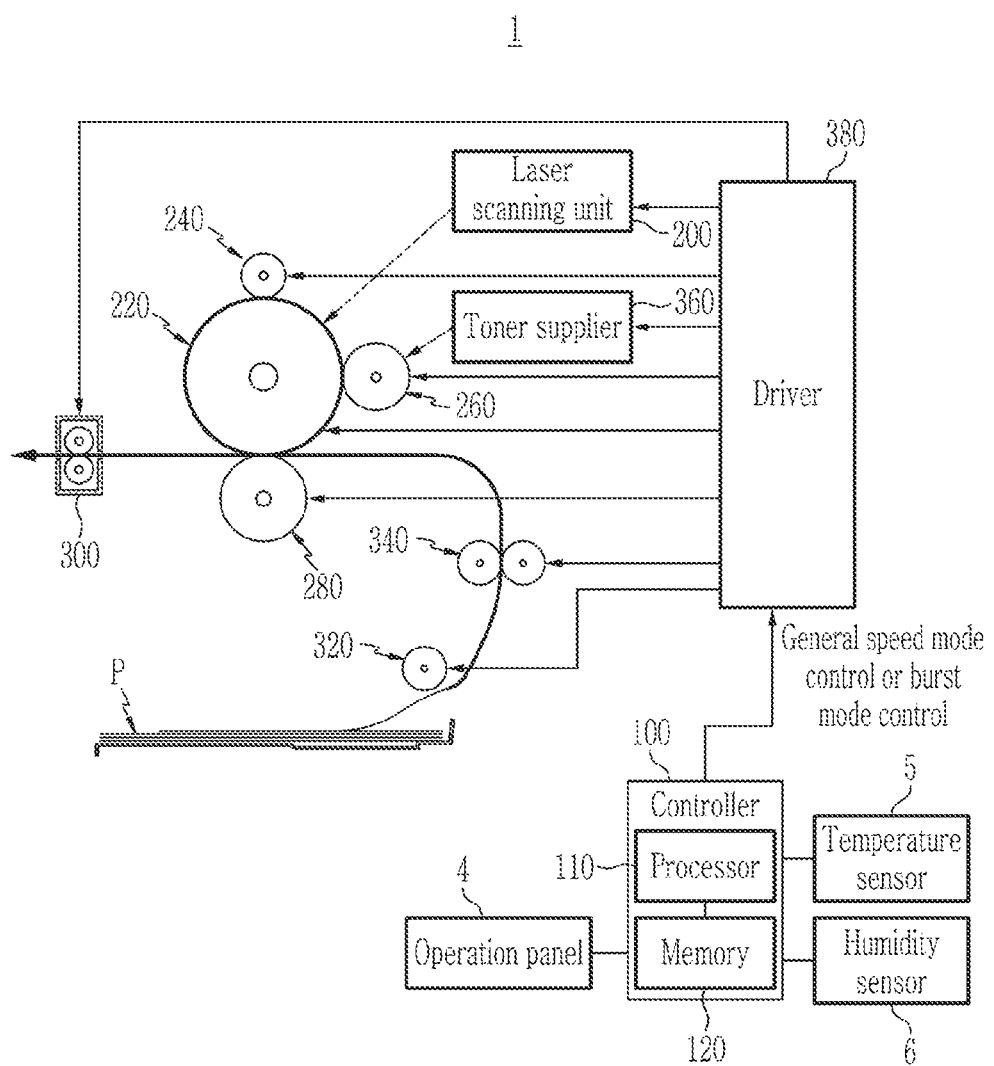
FIG. 8 is a diagram for conceptually explaining an image forming apparatus controlled by a processor according to an example.

FIG. 8 is a diagram for conceptually explaining an image forming apparatus controlled by a processor according to an example.

Referring to FIG. 8, the image forming apparatus 1 may include a controller 100 including a processor 110 and a memory 120, and mechanical devices and electronic devices operated by the controller 100. The processor 110 of the controller 100 can execute instructions that implement an example operation method of the present disclosure. A computer program includes instructions that implement an example operation method of the present disclosure and may be stored in a non-transitory computer readable storage medium. The processor 110 may be classified according to functions but will be described as one processor for convenience of explanation.

The processor 110 can provide a general speed mode having a threshold speed capable of providing the optimal image quality and performance in various conditions and a burst mode providing a speed faster than the threshold speed for a job satisfying a specific condition.

The processor 110 may analyze the job property and job data characteristic of a requested job and may set a speed mode of the job as a general speed mode or a burst mode. The processor 110 may obtain environment information measured by a temperature sensor 5 and a humidity sensor 6 and may use the environment information as a precondition of the burst mode.

The processor 110 may automatically and/or manually set the activation and/or deactivation of the burst mode function.

The processor 110 may provide a current status, a job status, a burst mode related menu, and the like on a display of an operation panel 4. The processor 110 may transmit a control signal corresponding to an activation and/or deactivation state of the burst mode function and progress of the burst mode, to a light emitting device 7.

The processor 110 may control devices related to image formation to operate in a predetermined speed mode for a job. The devices related to image formation may be differently implemented in each image forming apparatus, and the paths through which the control signal for the burst mode is transmitted to the devices related to image formation and control methods may be differently implemented in each image forming apparatus.

For example, the image forming apparatus 1 may include a laser scanning unit 200, a photoconductive drum 220, a charging roller 240, a developing roller 260, a transfer roller 280, a fuser 300, a pickup roller 320, a feed roller 340, a toner supplier 360, and a driver 380 for driving various devices. The driver 380 may be provided for each device. Although the processor 110 may be implemented to directly transmit the control signal to the devices, the devices related to the image formation may be driven by the driver 380 and the driver 380 may be controlled by the processor 110.

The laser scanning unit 200 may inject light modulated according to image data included in a job onto the surface of the photoconductive drum 220 charged with a uniform potential.

The surface of the photoconductive drum 220 may be charged with the uniform potential by the charging roller 240, and an electrostatic latent image may be formed on the surface of the photoconductive drum 220 by the laser scanning unit 200.

The charging roller 240 may be a charging device to charge the surface of the photoconductive drum 220 with a uniform potential, and a charging bias voltage may be applied thereto.

The toner supplied from the toner supplier 360 may be attached to the developing roller 260 and the developing roller 260 may supply the toner to the electrostatic latent image formed on the surface of the photoconductive drum 220. By the developing bias voltage applied to the developing roller 260, the toner can move to the electrostatic latent image formed on the photoconductive drum 220.

The pickup roper 320 may draw out a print medium P from a tray predetermined for a job, and the feed roller 340 may deliver the print medium P to a transfer nip formed of the transfer roller 280 and the photoconductive drum 220.

The transfer roller 280 may transfer a toner image formed on the photoconductive drum 220 to the delivered print medium. In the case of a color image forming apparatus, a transfer belt and an intermediate transfer body may be further included.

The fuser 300 may fix the toner image by applying heat and pressure to the print medium onto which the toner image is transferred, and may discharge the print medium.

The driver 380 may include a motor that generates power and a power transmission unit that transmits required power to devices. A drive current delivered to the motor may be controlled by the processor 110. In addition, the driver 380 may transmit a control signal required for operation to the connected devices. The control signal may be generated by the processor 110.

The processor 110 may change the drive current applied to the motor according to a speed mode, thereby changing a drive speed of the devices powered by the motor. When the speed mode is changed from the general speed mode to the burst mode, the processor 110 may provide a drive current higher than the general speed mode to the motor of the driver 380 so that a specific job can be processed with a burst mode speed faster than the threshold speed. Through this, the devices constituting an image forming path, such as the photoconductive drum 220, the charging roller 240, the developing roller 260, the transfer roller 280, the fuser 300, the pickup roller 320, and the feed roller 340, may rotate at different speeds depending on the speed mode. When the speed mode is changed from the burst mode to the general speed mode, the processor 110 may provide the motor of the driver 380 with a driving current predetermined for the general speed mode so that the job can be processed back again with the threshold speed.

The processor 110 may transmit, to the driver 380, a control signal in which image scan timing of a laser diode included in the laser scanning unit 200, the number of revolution of a polygon mirror, and the like are predetermined.

When the speed mode is changed from the general speed mode to the burst mode, the processor 110 may transmit, to the driver 380, a control signal which reduces the toner supply cycle of the toner supplier 360 by one half.

The processor 110 may transmit, to the driver 380, a control signal that changes a bias voltage related to the development of the photoconductive drum 220 to correspond to the speed mode.

The processor 110 may transmit, to the driver 380, a control signal that changes a target temperature of a fixing temperature to correspond to the speed mode. When the speed mode is changed from the general speed mode to the burst mode, the controller 100 may transmit, to the driver 380, a control signal that increases a target temperature of the fixing temperature that is higher than that for the general speed mode.

An example computer program executed by the processor 110 may include following instructions.

A computer program may include, for a job in a specific condition, instructions to activate the burst mode function providing a speed faster than a threshold speed predetermined in the general speed mode, instructions to determine whether a requested job satisfies the specific condition, instructions to set the speed mode of the request job satisfying the specific condition as the burst mode, and instructions to control devices related to image formation to operate in the burst mode when the processing order of the requested job is reached. Here, the specific condition may include a job property or a job data characteristic. The job property may include a predetermined paper size, a predetermined paper type, simplex printing, a predetermined image quality, and the like. The job data characteristic may include a graphic data ratio, or a ratio of blank and text data included in the job data. The specific condition may further include a predetermined temperature range and/or a predetermined humidity range.

The computer program may include instructions to display that the requested job is a job set to be performed in the burst mode on a user interface where the requested job is displayed. When the requested job satisfies the specific condition, the computer program may include instructions to display that the requested job is burst mode available on the user interface where the requested job is displayed, instructions to set the speed mode of the requested job as the burst mode upon receiving a request to set the burst mode for the requested job, and instructions to display that the requested job is a job set to be performed in the burst mode on the user interface.

The computer program may include instructions to visually display the activation status of the burst mode function, and instructions to visually indicate that the requested job is being processed in the burst mode.

For a job in a specific condition, the computer program may include instructions to activate the burst mode function providing a speed faster than a threshold speed of the general speed mode, instructions to determine whether the requested job satisfies the specific condition, instructions to set the speed mode of the requested job as the burst mode, and instructions to display that the requested job is a job set to be performed in the burst mode. The computer program may include instructions to determine whether the job property and job data characteristic satisfy the specific condition, when the temperature and/or humidity measured by sensors satisfy the predetermined temperature range and/or the predetermined humidity range included in the specific condition. The computer program may include instructions to control devices related to image formation to operate in the burst mode when the processing order of the requested job is reached. The computer program may include instructions to control the requested job set to be performed in the burst mode to be processed faster than the threshold speed, by changing the drive current of the motor transmitting power to the devices related to image formation according to the speed mode.

The computer program may include instructions to provide a general speed mode with a predetermined threshold speed and a burst mode providing a speed faster than the threshold speed for a job in a specific condition, instructions to determine a speed mode of the requested job as the burst mode or the general speed mode depending on whether the requested job satisfies a specific condition and control the driver to process the corresponding job at a speed mode predetermined for each of the requested job.

The examples described above may be implemented through an apparatus and a method, and may be implemented through a program for realizing a function corresponding to the configuration of the examples of the present disclosure or a recording medium on which the program is recorded.

Although various examples have been described above, the scope of the present disclosure is not limited thereto, and various modifications and improvements by those skilled in the art using the basic concepts defined in the following claims also fall within the scope of rights.

What is claimed is:

1. A method of operating an image forming apparatus operated by a processor, the method comprising:
   activating a burst mode function to provide a speed faster than a threshold speed of a general speed mode for a job having a specific condition;
   determining whether each page of a plurality of pages of a requested job satisfies the specific condition prior to image formation of the requested job;
   setting a speed mode of the requested job satisfying the specific condition as the burst mode;
   controlling a device related to image formation to operate in the burst mode when a processing order of the requested job is reached;
   controlling the device related to image formation to operate in the burst mode for each page of the plurality of pages of the requested job that satisfies the specific condition; and
   controlling the device related to image formation to operate in the general speed mode for each page of the plurality of pages of the requested job that does not satisfy the specific condition.

2. The method of claim 1,
   wherein the specific condition includes a job property or a job data characteristic,
   wherein the job property includes a predetermined paper size, a predetermined paper type, simplex printing, or predetermined image quality, and
   wherein the job data characteristic includes a graphic data ratio or a ratio of blank and text data included in job data.

3. The method of claim 2, wherein the specific condition further includes a predetermined temperature range or a predetermined humidity range.

4. The method of claim 1, further comprising displaying that the requested job is a job set as the burst mode on a user interface.

5. The method of claim 1, wherein the setting of the burst mode comprises:
   when the plurality of pages of the requested job satisfies the specific condition, displaying that the requested job is a burst mode available job on a user interface displaying the requested job; and
   upon receiving a request to set the burst mode for the requested job, setting the speed mode of the requested job as the burst mode and displaying that the requested job is a job set as the burst mode on the user interface.

6. The method of claim 1, further comprising:
   displaying an activation status of the burst mode function; and
   displaying that the request job is being processed in the burst mode.

7. The method of claim 1, further comprising providing a user interface for selecting activation or deactivation of the burst mode function.

8. The method of claim 1, wherein setting a speed mode of the requested job as the burst mode is done in response to determining whether the plurality of pages of the requested job satisfies the specific condition.

9. An image forming apparatus comprising:
   an operation panel to provide a user interface; and
   a processor to, for a job of a specific condition:
      activate a burst mode function to provide a speed faster than a threshold speed of a general speed mode;
      determine whether each page of a plurality of pages of a requested job satisfies the specific condition prior to image formation of the requested job;
      set a speed mode of the requested job satisfying the specific condition as a burst mode;
      control a device related to image formation to operate in the burst mode for each page of the plurality of pages of the requested job that satisfies the specific condition;
      control the device related to image formation to operate in the general speed mode for each page of the plurality of pages of the requested job that does not satisfy the specific condition; and
      display that the requested job is a job set as the burst mode on the user interface.

10. The image forming apparatus of claim 9, wherein the processor is to:
   display that the requested job is a burst mode available job on the user interface when the plurality of pages of the request job satisfies the specific condition;
   set the speed mode of the requested job as the burst mode upon receiving a request to set the burst mode for the requested job; and
   display that the requested is a job set as the burst mode on the user interface.

11. The image forming apparatus of claim 9, wherein the processor is to provide the user interface with a menu for selecting activation or deactivation of the burst mode function.

12. The image forming apparatus of claim 9, further comprising a light emitting device to display an activation status of the burst mode function or display that the requested job is being processed in the burst mode.

13. The image forming apparatus of claim 9, further comprising a sensor to measure temperature or humidity,
   wherein the processor is to determine whether a job property and a job data characteristic satisfy the specific condition when the temperature or the humidity measured by the sensor respectively satisfies a predetermined temperature range or a predetermined humidity range included in the specific condition.

14. The image forming apparatus of claim 13,
   wherein the job property includes a predetermined paper size, a predetermined paper type, simplex printing, or predetermined image quality, and
   wherein the job data characteristic includes a graphic data ratio or a ratio of blank and text data included in job data.

15. The image forming apparatus of claim 9, wherein the processor is to control a device related to image formation to operate in the burst mode when a processing order of the requested job is reached.

16. The image forming apparatus of claim 15, wherein the processor is to control the requested job set as the burst mode to be processed faster than the threshold speed by changing a drive current of a motor supplying power to a device related to image formation according to the speed mode.

17. The image forming apparatus of claim 9, wherein the speed mode of the requested job is set as the burst mode in response to the determination that the specific condition is satisfied for the plurality of pages of the requested job.

* * * * *